(12) United States Patent
Staples et al.

(10) Patent No.: US 8,704,824 B2
(45) Date of Patent: Apr. 22, 2014

(54) INTEGRATED HISTORY-FREE AND HISTORY-BASED MODELING

(75) Inventors: Daniel C. Staples, Cape Elizabeth, ME (US); Jeffrey A. Walker, Huntsville, AL (US); Mallikarjuna Gandikota, Pune (IN); Ganapathy S. Kunda, Madison, AL (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 745 days.

(21) Appl. No.: 12/893,527

(22) Filed: Sep. 29, 2010

(65) Prior Publication Data

US 2012/0078580 A1   Mar. 29, 2012

(51) Int. Cl.
*G06F 17/50* (2006.01)

(52) U.S. Cl.
CPC .................... *G06F 17/5009* (2013.01)
USPC ............... 345/419; 345/420; 345/428; 703/2; 707/749; 715/848

(58) Field of Classification Search
CPC .................................................. G06F 17/5009
USPC ............... 345/419, 420, 428; 703/2; 707/749; 715/848
See application file for complete search history.

(56) References Cited

U.S. PATENT DOCUMENTS

| | | | | |
|---|---|---|---|---|
| 6,396,522 B1 * | 5/2002 | Vu | | 715/848 |
| 6,636,211 B2 * | 10/2003 | Chartier et al. | | 345/420 |
| 6,788,300 B2 * | 9/2004 | Ramaswami et al. | | 345/420 |
| 7,079,990 B2 * | 7/2006 | Haller et al. | | 703/2 |
| 7,170,509 B2 * | 1/2007 | Tanaka et al. | | 345/419 |
| 8,421,798 B2 * | 4/2013 | Rameau et al. | | 345/419 |
| 8,429,174 B2 * | 4/2013 | Ramani et al. | | 707/749 |
| 2008/0221840 A1 | 9/2008 | Bassi et al. | | |

FOREIGN PATENT DOCUMENTS

EP    1501026 A1    1/2005

OTHER PUBLICATIONS

Siemens, Solid Edge ST3 . . . The Future of 3D Design, Today, Siemens PML software representation, pp. 1-16, Aug. 25, 2010.*
Siemens, What is new in Solid Edge ST3, Siemens PML software, pp. 1-6, 2010.*
PCT International Search Report mailed Dec. 8, 2011 corresponding to PCT International Application No. PCT/US2011/053852 filed Sep. 29, 2011 (17 pages).
Machine Design: Comparing 3D CAD modelers, Nov. 22, 2006, Leslie Gordon: Senior Editor (4 pages).
Rudiger Klein, Proceedings: Fourth Symposium on Solid Modeling and Application, Renaissance Atlanta Hotel, Atlanta Georgia, May 14-16, 1997 (12 pages).

* cited by examiner

*Primary Examiner* — Phu K Nguyen (57) ABSTRACT

A system, method, and computer readable medium. A method includes receiving a model tree that defines a three-dimensional (3D) model. The model tree includes a history-free parent node that defines a complex 3D model and a plurality of history-based child nodes that define additional features that modify the complex 3D model. The method includes computing the 3D model, where the computed 3D model combines the parent node and the child nodes. The method includes displaying the computed 3D model as the complex 3D model modified by the additional features defined by the child nodes.

24 Claims, 5 Drawing Sheets

INTEGRATED HISTORY-FREE AND HISTORY-BASED MODELING

TECHNICAL FIELD

The present disclosure is directed, in general, to systems and methods for use in computer-aided design, manufacturing, engineering, prototype/test, maintenance, modeling, and visualization (individually and collectively, "CAD" and "CAD systems") and in product lifecycle management ("PLM") and other systems.

BACKGROUND OF THE DISCLOSURE

Improved processes and systems for developing and manipulating graphic models are desirable.

SUMMARY OF THE DISCLOSURE

Various embodiments include a system, method, and computer readable medium. A method includes receiving a model tree that defines a three-dimensional (3D) model. The model tree includes a history-free parent node that defines a complex 3D model and a plurality of history-based child nodes that define additional features that modify the complex 3D model. The method includes computing the 3D model, where the computed 3D model combines the parent node and the child nodes. The method includes displaying the computed 3D model as the complex 3D model modified by the additional features defined by the child nodes.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Graphics modeling in CAD and PLM systems is typically performed using either history-based modeling or history-free modeling. In general, the primary difference between these two is that a history-based model has features that depend linearly on the feature that directly precedes it in the features list or "history tree". A history-free model has no inherent feature-to-feature dependencies. Synchronous modeling may be considered a form of history-free modeling for purposes of this disclosure.

In general, a given part file can only maintain either a history-based model definition or a history-free model definition. This "segregation" means that the user cannot accrue the benefits of either technology at a particular time, but must choose to work with one or the other type of model.

Disclosed embodiments include systems and methods that allow mixing these technologies.

Direct editing is a method of directly interacting with the faces of the model, in a way that is similar to history-free; however, it is not history free, insomuch as to be able to update reliably, each individual edit must be captured in the tree. So if a user makes ten edits to a part the resulting tree will have ten nodes. This makes making a large number of these edits at the end of the tree impractical and in fact is just another form of history-based modeling.

Toggling between history-free modeling and history-based modeling has been unsuccessful since virtually all the information used/stored in one type is lost when transitioning to the other type. The entire model is "converted" from one type to the other and, for example, all of the history information is lost.

In general, history-free modeling offers more flexibility and design freedom. Conversely, history-based modeling offers great predictability and reliability in certain instances. Additionally, some design problems, such as depicting both as-cast and as-machined states of a part, lend themselves to the "ordered" methodology of history-based modeling because they are, by definition, process-based and therefore order is paramount.

By allowing the history-based modeling and history-free modeling to be maintained and used in the same part file, and in the same tree, disclosed embodiments achieve a new level of productivity and allow the user both the flexibility of history-free modeling and the ordered nature of history-based modeling when needed.

According to various embodiments, a history-free node is placed at the top of the compute order, rather than the bottom. Within this top node, the user can make any history-free edits he desires. Using this technique, there is absolutely no need to keep track of the steps he does and he may place driving dimensions at any time in any order.

History-based features may be added after this node. These compute in order one after the other, using the history-free node as the starting point. In a sense, the history-free node at the top is a very sophisticated "base feature". The user may choose to do a design with all features in the history-based portion, all features in the history-free portion or a portion in each, being coordinated in a cooperative manner. As used herein, a "model tree" refers to a structure with a history-free node as described herein with history-based features depending from it.

According to various embodiments, it is possible also to migrate one or more features from the history-tree portion of the model up into the history-free portion of the model without any change to the resulting solid. It is also possible to migrate many features "downward" from the history-free portion to the history-based portion.

Figure 1:
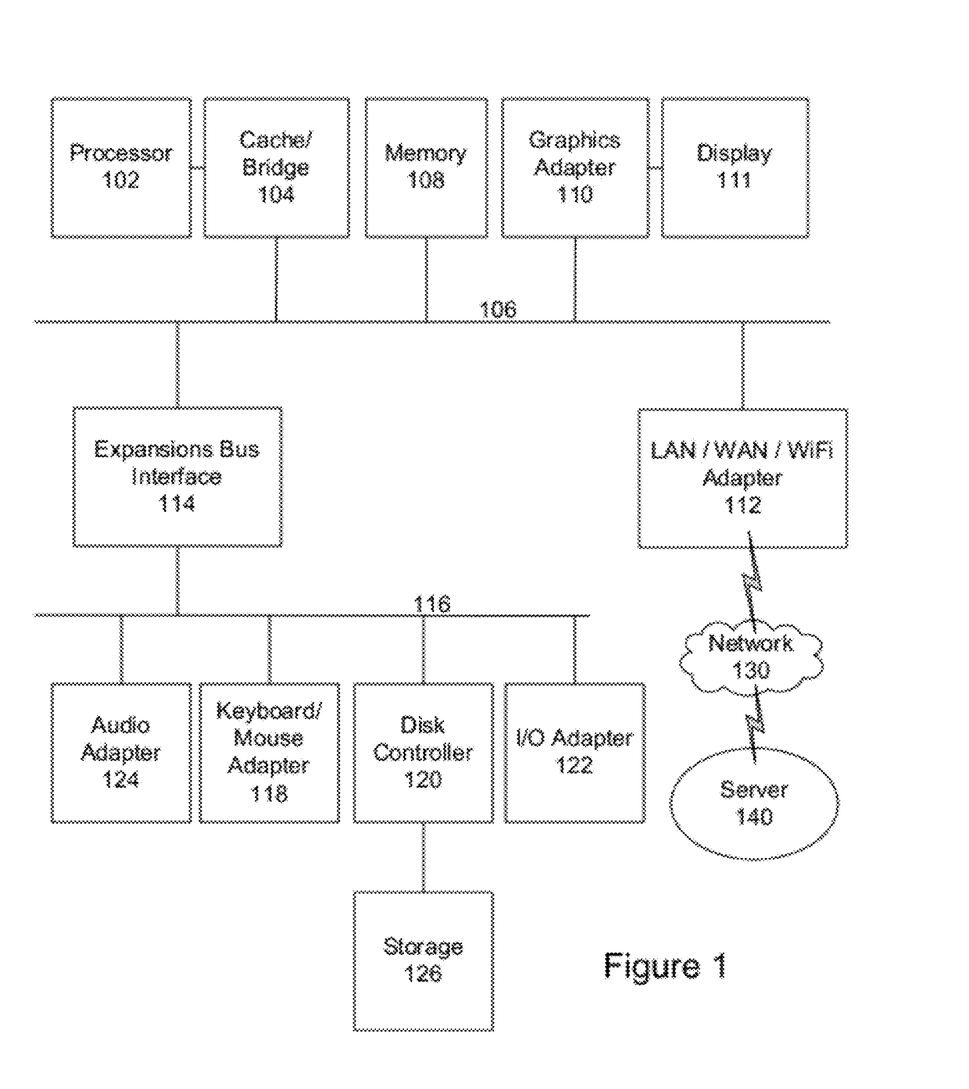
FIG. 1 depicts a block diagram of a data processing system in which an embodiment can be implemented in accordance with disclosed embodiments.

FIG. 1 depicts a block diagram of a data processing system in which an embodiment can be implemented, for example as a CAD or PLM system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. One or both of data processing system 100 and server system 140 can be configured to perform the processes described herein.

Disclosed embodiments provide systems and methods that combine a history-free parent node or portion with history-based child nodes in a model tree so that the history-free node "precedes" at least some of the history-based child nodes. The user can edit either or both of the history-free portion or the history-based portion of the tree, and the system automatically re-computes the dependent portion of the entire model on an interactive basis, by first computing the history-free parent node or portion, if necessary, and then making appropriate modifications as it traverses the remainder of the tree.

Further, in various embodiments, history-based nodes can be "moved" into the history-free nodes by recomputing the base model that will comprise the history-free node to include the features defined by the selected history-based nodes. A new tree can then be generated using the modified model as the base history-free node, and structuring the remaining unselected history-based nodes to depend from the new history-free node.

Further, in various embodiments, selected features of the history-free node can be "moved" into the history-based tree extracting these features from the history-free base node and creating dependent child nodes for each of these selected features. The system re-computes the base model that makes up the history-free node to exclude the extracted features. A new tree can then be generated using the modified model as the base history-free node, and structuring the extracted features as dependent history-based nodes that depend from the new history-free node.

Figure 2:
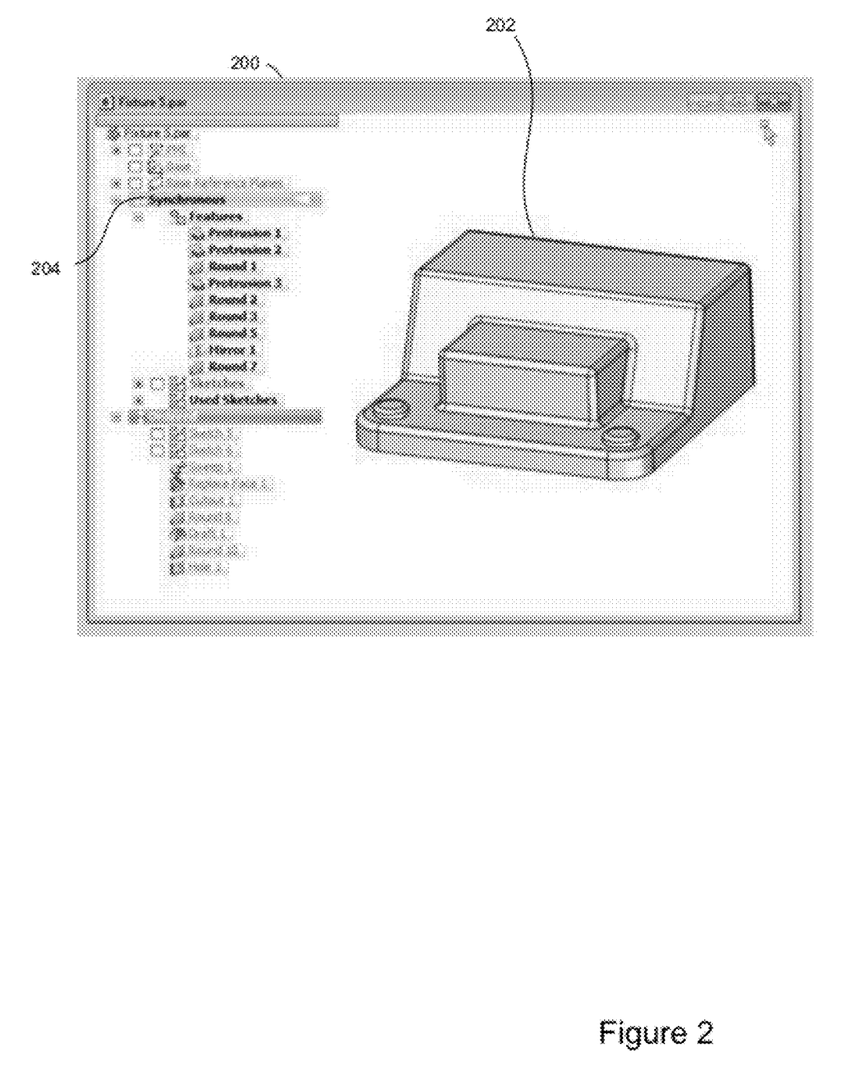
FIGS. 2 and 3 show an exemplary user interfaces of a system in accordance with disclosed embodiments.

FIG. 2 shows an exemplary user interface 200 of a system in accordance with disclosed embodiments, as might be implemented, for example, as a data processing system 100 showing the user interface on display 111 and particularly configured to perform processes as described herein. In the following figures, the "Synchronous" node represents the "history-free" based node and the "Ordered" node represents the "history-based" remaining portion of the tree. As shown in the following figures, some of the features are history-free and the history-based features, such as a complex surface, cutout, and some rounds, are evaluated based on that base node to create the final model.

User interface 200 shows a history-free or synchronous base-node model 202 without showing the history-based features. The model is defined by a history-free node 204, shown on the left, with its defining features such as protrusions, rounds, and a mirror feature. In accordance with disclosed embodiments, this multi-feature history-free node 204 is then used as a base node, and parent node, for subsequent history-based nodes that include history-based features that further modify the history free-node 204. Note that history-free node 204 is a multi-feature node in that it represents a complex three-dimensional model, unlike a base node in a conventional history-based tree. "Complex", in this context, is intended to indicate that the history-free node includes multiple features that would require multiple nodes to represent in a history-based form, but is not intended to require a specific or large number of features to be present in the history-free node.

User interface 200 can be used to allow a user to edit the history-free portion of the tree. In some embodiments, when this is occurring, the history-based features are not shown in the model during the edit, depending on a received user selection. The history-based features from the tree can be depicted, for example, as grayed-out text in the lower portion of the tree on the left of the figure.

Figure 3:
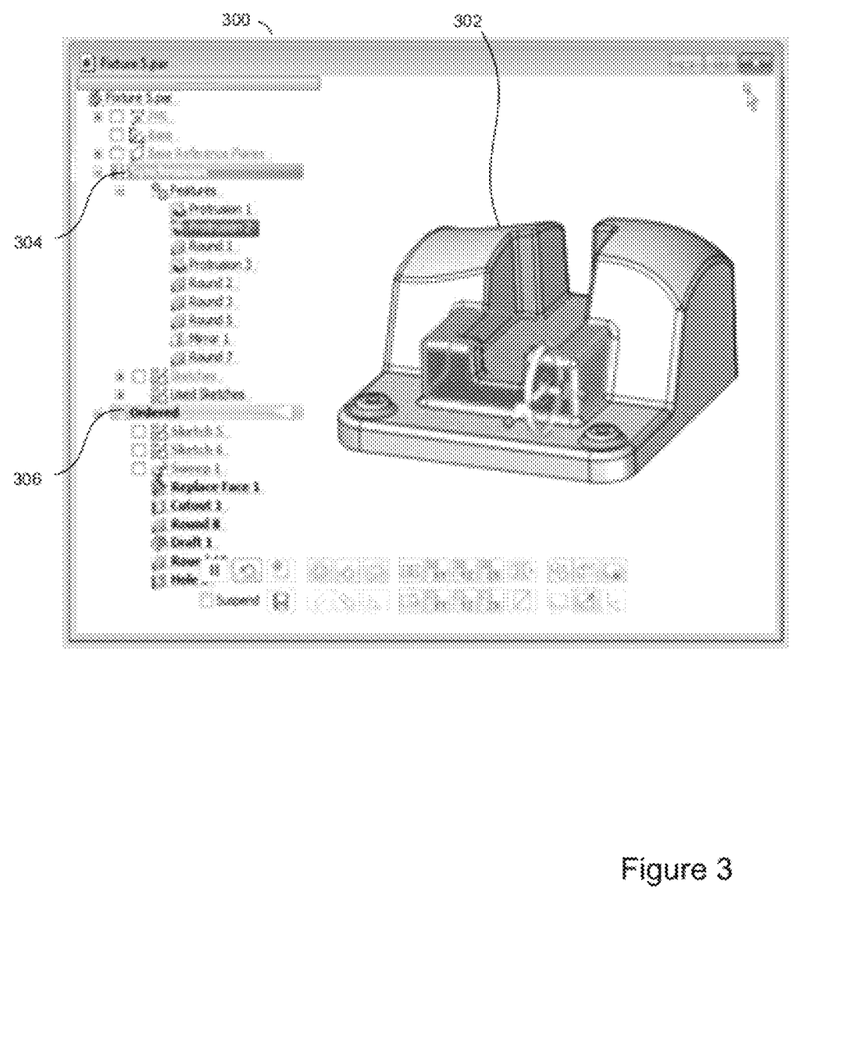

FIG. 3 shows an exemplary user interface 300 of a system in accordance with disclosed embodiments. User interface 300 shows a model 302 produced using both the history-free base node and the subsequent history-based feature nodes. The base model is defined by history-free node 304, shown on the left, with its defining features such as protrusions, rounds, and a mirror feature. This multi-feature history-free node 304 is then used as a base node, and parent node, for subsequent history-based nodes 306 that include history-based features that further modify the history free-node 304. Note that history-free node 304 is a multi-feature node in that it represents a complex three-dimensional model, unlike a base node in a conventional history-based tree.

Model 302 is much more sophisticated as compared to model 202, since the history-based nodes (and features) are also shown. User interface 300 can be used to allow a user to edit the history-free portion or the history-based portion of the tree. In some embodiments, when this is occurring, the history-based features are also shown in the model during the edit, depending on a received user selection. In this way, as the system receives user edits to either portion of the tree, the model 302 is updated in real time to reflect the complete model, including history-free based node features and the subsequent history-based features.

Figure 4:
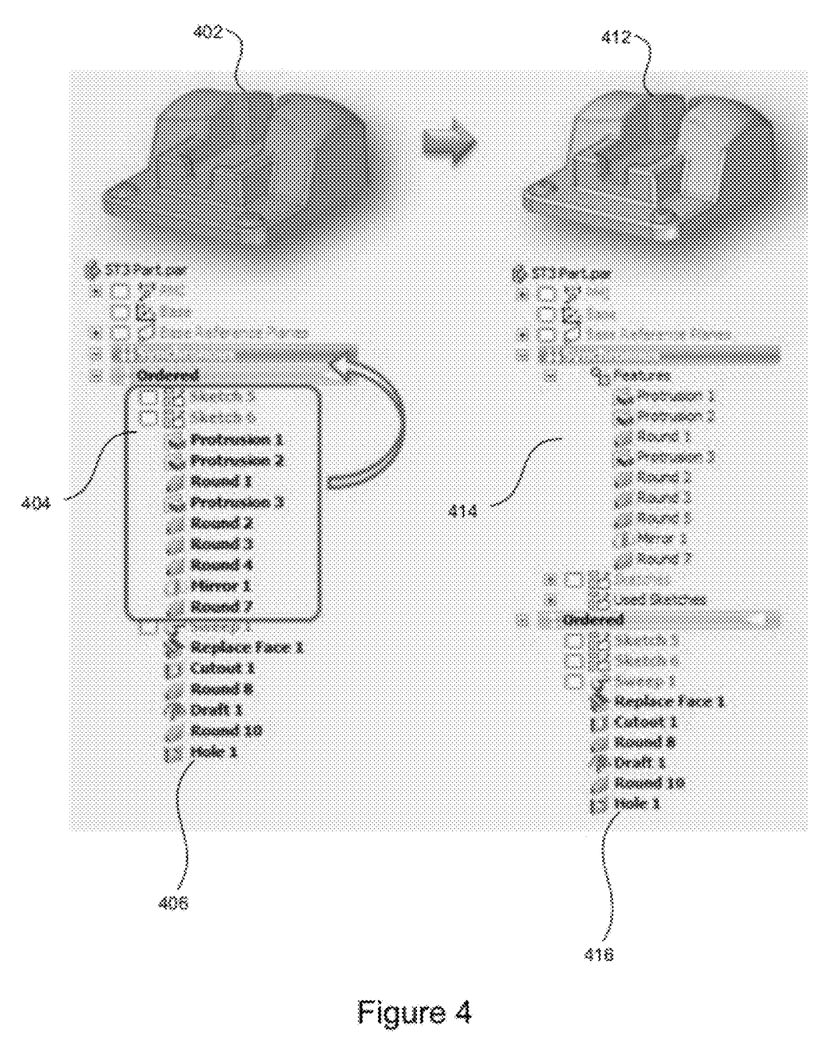
FIG. 4 illustrates a process of moving history-based features into the history-free node to form a new base node, in accordance with disclosed embodiments.

FIG. 4 illustrates a process of moving history-based features into the history-free node to form a new base node, in accordance with disclosed embodiments. In this figure, model 402, generally corresponding to model 302, is shown as created using a history-free node and a multiple history-based features/nodes 404 in tree 406. In this example, the user has selected a subset of nodes 404 to be moved from the history-based portion of the tree into the history-free synchronous portion of the tree 406.

In the second tree 416, the selected features 414 are now shown as part of the history-free synchronous node. The corresponding model 412 looks the same as model 402, since it is a fully-computed combination of both the history-free and history-based portions, but the selected features are now part of the history-free base node, and can be edited using synchronous modeling techniques. In some embodiments, the old base node and tree can be discarded and replaced with the new base node (including the moved features) and a new dependent tree (without the moved features).

When features are moved to the history-free portion of the model, "unders" are maintained, but relationships and dimensions can be altered, and relationships within the synchronous portion are then managed as synchronous features.

The opposite process can also be performed, where synchronous history-free features are moved from the synchronous portion into the history-based portion of the tree. The system determines the proper order of feature dependency to accurately re-compute and reproduce the model.

Figure 5:
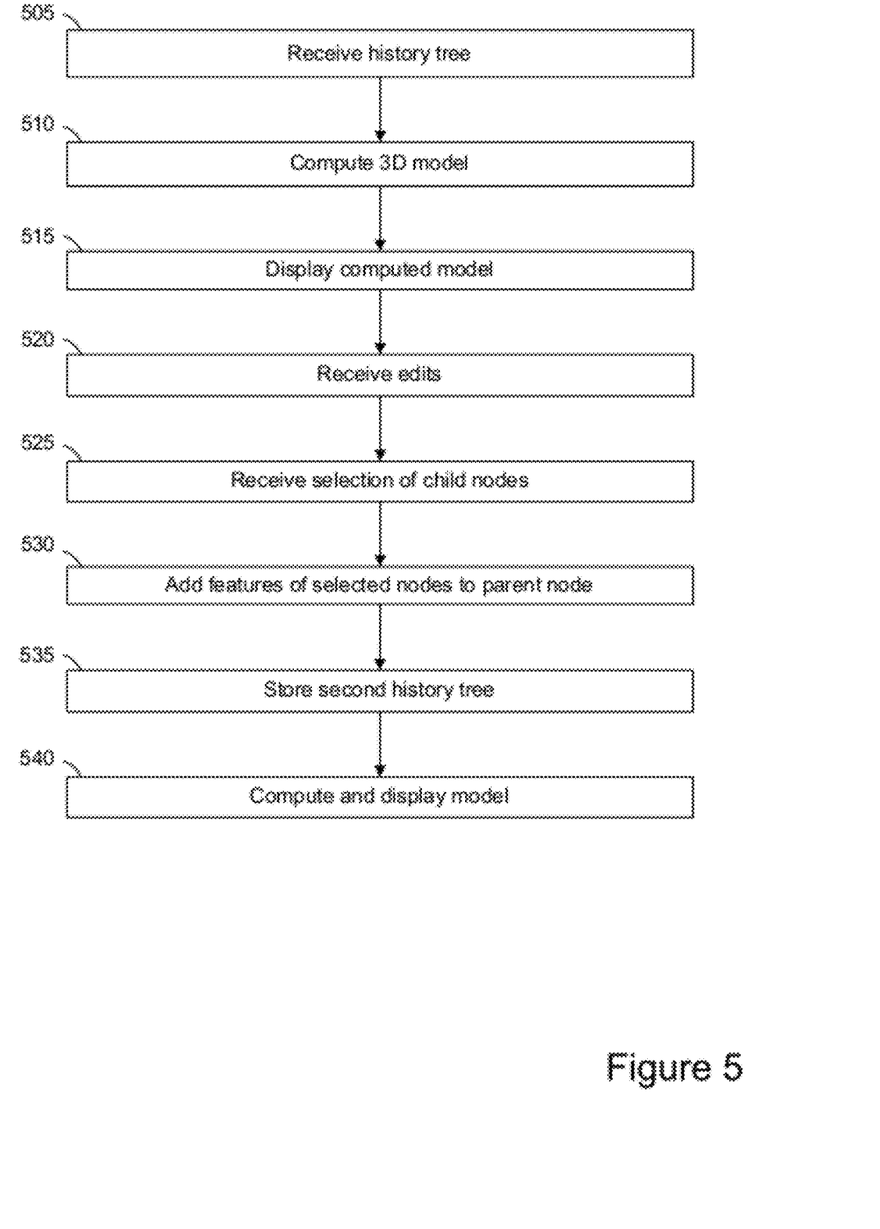
FIG. 5 depicts a flowchart of a process in accordance with disclosed embodiments.

FIG. 5 depicts a flowchart of a process in accordance with disclosed embodiments, as may be performed by a data processing system, such as one implemented as a CAD or PLM system.

The system receives a model tree that defines a three-dimensional model (step 505). The model tree includes a history-free portion that includes a history-free parent node that defines a complex three-dimensional (3D) model and history-based portion that includes a plurality of subsequent child nodes of the parent node that define additional features that modify the complex 3D model. "Receiving," as used herein, can include loading from storage, receiving from another system such as over a network, receiving via an interaction with a user, or otherwise.

The system computes the 3D model defined by the model tree that combines the parent node and the child nodes (step 510).

The system displays the computed 3D model (step 515). The computed 3D model depicts the complex 3D model of the parent node as modified by the child nodes.

The system can receive edits to the 3D model (step 520), and as or after each edit is received, re-computing and displaying the edited 3D model (returning to step 510). Each edit can be a synchronous edit to the history-free parent node, or a traditional edit to the history-based portion, such as adding, deleting, or modifying a child node.

The system can receive a selection of child nodes to be moved to the parent node (step 525), in order to move features from the history-based portion of the tree to the history-free portion of the tree.

The system adds the features represented by the child nodes to the complex 3D model represented by the parent node (step 530).

The system stores a model tree including a parent node reflecting the first complex 3D model and the features represented by the selected nodes and including a plurality of the child nodes depending from the new parent node that do not include the selected child nodes (step 535). In this way, the features represented by the selected child nodes are removed as child nodes and incorporated in the new parent node. The model tree can either be a new model tree entirely, replacing the original model tree, or a modified version of the original model tree, and will be referred to as a second model tree in either case.

The system computes and displays a 3D model corresponding to the second history tree that combines the new parent node and the remaining child nodes (step 540).

The various steps of processes described herein may be performed concurrently, sequentially, repeatedly, or in a different order unless otherwise described or claimed.

Other embodiments can also perform a process of moving features from this history-free portion of the model tree to the history-based portion of the model tree. In such a case, the system can receive a selection of features of the complex 3D model, remove the selected features from the parent node, and create a child node corresponding to each of the selected features. In this way, the features previously found in the history-free parent node are now represented by history-based child nodes.

Disclosed embodiments combine the two paradigms of current modeling into one. This removes the boundaries between the two, and allows full operation of all commands in one environment. Disclosed embodiments use the best abilities in each paradigm to enhance traditional history-based editing and modeling and allow complete synchronous modeling. These give the traditional modeling environment "sync-like" abilities and allow synchronous models to be "fleshed out" to equivalency faster.

In various embodiments, each modeling type can operate independently within the same file, and if no synchronous operations are initiated, then the file behaves like a conventional history-based model file. When both types exists in the same file, the model is computed from the synchronous based node to the subsequent history-based nodes. The synchronous modeling operations would occur within the separate node within the same part file, and all manipulations of the synchronous body can be then used to initiate a solve of the history tree.

The history-free base node can be operated upon with synchronous workflows, including Move, Rotate, Dimensions, and Relate. Any relationships between the history-free base and the history-based features are solved with history-based rules, including dimensions and geometric relationships. The synchronous base is used as the input to all the dependent children history-based nodes. The re-compute is still based on the chronological order expressed in the entire history tree, starting with the history-free base node.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method, comprising:
   receiving, in a data processing system, a model tree that defines a three-dimensional (3D) model, the model tree including a history-free parent node that defines a complex 3D model and a plurality of history-based child nodes that define additional features that modify the complex 3D model;
   computing the 3D model by the data processing system, the computed 3D model combining the parent node and the child nodes; and
   displaying the computed 3D model by the data processing system as the complex 3D model modified by the additional features defined by the child nodes.

2. The method of claim 1, further comprising receiving an edit to the 3D model, and re-computing and displaying the edited 3D model.

3. The method of claim 2, wherein the edit is an edit to the parent node.

4. The method of claim 2, wherein the edit is an added history-based child node.

5. The method of claim 2, wherein the edit is a modified history-based child node.

6. The method of claim 1, further comprising receiving a selection of child nodes to be moved to the parent node and adding the features defined by the selected child nodes to the complex 3D model defined by the parent node.

7. The method of claim 6, further comprising defining a second model tree that includes a history-free parent node that defines a complex 3D model and the added features and that includes a plurality of history-based child nodes that define additional features that modify the complex 3D model but do not include the selected child nodes.

8. The method of claim 1, further comprising receiving a selection of features of the complex 3D model, removing the selected features from the parent node, and creating a child node corresponding to each of the selected features.

9. A data processing system comprising:
   a processor; and
   an accessible memory, wherein the data processing system particularly configured to
   receive a model tree that defines a three-dimensional (3D) model, the model tree including a history-free parent node that defines a complex 3D model and a plurality of history-based child nodes that define additional features that modify the complex 3D model;
   compute the 3D model, the computed 3D model combining the parent node and the child nodes; and
   display the computed 3D model as the complex 3D model modified by the additional features defined by the child nodes.

10. The data processing system of claim 9, wherein the data processing system is also configured to receive an edit to the 3D model, and re-compute and display the edited 3D model.

11. The data processing system of claim 10, wherein the edit is an edit to the parent node.

12. The data processing system of claim 10, wherein the edit is an added history-based child node.

13. The data processing system of claim 10, wherein the edit is a modified history-based child node.

14. The data processing system of claim 9, wherein the data processing system is also configured to receive a selection of child nodes to be moved to the parent node and add the features defined by the selected child nodes to the complex 3D model defined by the parent node.

15. The data processing system of claim 14, wherein the data processing system is also configured to define a second model tree that includes a history-free parent node that defines a complex 3D model and the added features and that includes a plurality of history-based child nodes that define additional features that modify the complex 3D model but do not include the selected child nodes.

16. The data processing system of claim 9, wherein the data processing system is also configured to receive a selection of features of the complex 3D model, remove the selected features from the parent node, and create a child node corresponding to each of the selected features.

17. A non-transitory computer-readable medium encoded with computer-executable instructions that, when executed, cause a data processing system to perform the steps of:
receiving a model tree that defines a three-dimensional (3D) model, the model tree including a history-free parent node that defines a complex 3D model and a plurality of history-based child nodes that define additional features that modify the complex 3D model;
computing the 3D model, the computed 3D model combining the parent node and the child nodes; and
displaying the computed 3D model as the complex 3D model modified by the additional features defined by the child nodes.

18. The computer-readable medium of claim 17, further encoded with computer-executable instructions that, when executed, cause the data processing system to perform the steps of receiving an edit to the 3D model, and re-computing and displaying the edited 3D model.

19. The computer-readable medium of claim 18, wherein the edit is an edit to the parent node.

20. The computer-readable medium of claim 18, wherein the edit is an added history-based child node.

21. The computer-readable of claim 18, wherein the edit is a modified history-based child node.

22. The computer-readable medium of claim 17, further encoded with computer-executable instructions that, when executed, cause the data processing system to perform the steps of receiving a selection of child nodes to be moved to the parent node and adding the features defined by the selected child nodes to the complex 3D model defined by the parent node.

23. The computer-readable medium of claim 22, further encoded with computer-executable instructions that, when executed, cause the data processing system to perform the steps of defining a second model tree that includes a history-free parent node that defines a complex 3D model and the added features and that includes a plurality of history-based child nodes that define additional features that modify the complex 3D model but do not include the selected child nodes.

24. The computer-readable medium of claim 17, further encoded with computer-executable instructions that, when executed, cause the data processing system to perform the steps of receiving a selection of features of the complex 3D model, removing the selected features from the parent node, and creating a child node corresponding to each of the selected features.

* * * * *